UNITED STATES PATENT OFFICE.

FRITZ HOFMANN AND KURT GOTTLOB, OF ELBERFELD, GERMANY, ASSIGNORS TO SYNTHETIC PATENTS CO., INC., OF NEW YORK, N. Y., A CORPORATION OF NEW YORK.

PRODUCTION OF VULCANIZED SYNTHETIC CAOUTCHOUC.

1,130,903.      Specification of Letters Patent.      Patented Mar. 9, 1915.

No Drawing.     Application filed October 16, 1913. Serial No. 795,506.

*To all whom it may concern:*

Be it known that we, FRITZ HOFMANN and KURT GOTTLOB, doctors of philosophy, chemists, citizens of the German Empire, residing at Elberfeld, Germany, have invented new and useful Improvements in the Production of Vulcanized Synthetic Caoutchouc, of which the following is a specification.

In Patents 1,081,613 and 1,081,614, there are described new caoutchouc substances and the vulcanization products thereof, which are obtained by treatment of the autopolymerization product of beta-gamma-dimethylerythrene with basic substances and by vulcanization of the resulting products. We have now found that among these basic substances, certain open carbon chain bases or closed carbon chain bases lend themselves most excellently for carrying out our process.

Among the open carbon chain bases we have found that tetramethylenediamin, pentamethylenediamin, beta-beta-dimethyl-delta-methyl-trimethyleneimin of the formula

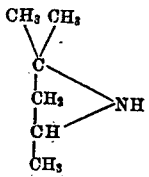

and their derivatives, and the urea and carbon bisulfid derivatives of bases such as dimethylamin, give very good results.

Among the closed carbon chain bases we have found that piperidin, methylpiperidin, n-thiopiperidin, benzaldipiperyl, piperidyl-dithiocarbamidate of piperidin, mono-piperidylurea, and in particular the solid and liquid derivatives of piperidin and its homologues which have no odor or only a faint odor, gave most excellent results.

We have also found that it was most advantageous to use those members of the open carbon chain and closed carbon chain classes which are not fugitive at the temperature of vulcanization. From the chemical constitution of the above specific basic substances which have been found useful in our process, it seems that all of these substances may be termed "methylene bases," and that they are saturated bases as distinguished from unsaturated bases, such as anilin or pyridin, etc. We shall therefore use the term "methylene base" when referring generically to the above defined basic substance in the description and specification of our process.

In our new process a small amount of the methylene base is incorporated with the autopolymerization product before or simultaneously with the incorporation of the sulfur, or with other vulcanizing agents. The base materially facilitates the vulcanization which is subsequently effected, and the vulcanization proceeds more quickly and more smoothly. The process results in the production of a superior vulcanized polymerization product of beta-gamma-dimethylbutadiene containing the methylene bases above mentioned incorporated or combined therewith, either physically or chemically; all as more fully hereinafter set forth and as claimed.

By the use of methylene bases, such as piperidin, etc., it is possible to obtain a vulcanized soft or hard rubber-like product. Piperidin or the other methylene bases may be incorporated with the autopolymerization product either before or simultaneously with the sulfur or other vulcanizing agents, and either immediately before, or a considerable time before vulcanization.

The following examples further illustrate the production of the novel products according to the present invention:—

Example 1: 100 parts of the autopolymerization product of beta-gamma-dimethylbutadiene (see Kondakow, *Journal für prakt. Chemie 64*, p. 109-110) are mixed with 0.75 parts of piperidin on the mixing rolls, and either at the same time or subsequently 25 parts of sulfur are added. The mixture is then heated for two hours at 160-165° C. An excellent hard rubber product is obtained. The incorporation of piperidin can be effected by macerating the autopolymerization product with a solution of the base, or by mixing with the base directly, or by forming the product in the presence of the base, etc., according to the processes more fully described in application, Serial No. 688762. Instead of piperidin, its homologues, etc., can be similarly used.

Example 2: Soft rubber products can be obtained by using a smaller amount of sulfur, or by carrying out the vulcanization at a lower temperature or for a shorter time. 100 parts of the autopolymerization product (Kondakow, loc. cit.) are heated with 10 parts of sulfur and 0.75 parts of piperidin for one hour at 120–125° C. (2¼ atmospheres). The resulting product is a soft vulcanized product. A similar product can be obtained by heating for 15 minutes at 135–145° C. (3½ atmospheres).

Example 3: 100 parts of the autopolymerization product are mixed with 1.5 parts of piperidyldithiocarbamidate of piperidin, while at the same time or a little later 50 parts of sulfur are added and incorporated. The mixture is heated for 4 hours at 155° C. (5–6 atmospheres). An excellent hard rubber material is obtained, which in thin layers or after polishing shows a beautiful tortoise shell effect. If instead of 50 parts of sulfur, only 30 or 40 parts are used, a good product can still be obtained. Instead of the above derivative of piperidin, other derivatives, either solid or liquid, can be used in a similar manner and in a similar or corresponding amount.

Example 4: 100 parts of the autopolymerization product are mixed with 10 parts of sulfur and 1 part of n-thiopiperidin (Michaelis, *Berichte* 28, 1013) on the mixing rolls. The mixture is heated for 1 hour at 120 to 125° C. (2¼ atmospheres). A soft rubber product is thus obtained.

Example 5: 100 parts of the autopolymerization product are mixed with 1 part of tetramethylenediamin and 50 part of sulfur on the mixing rolls, and the mixture is heated for 3 hours at 143° C. A hard rubber product is thus obtained.

Example 6: 100 parts of the polymerization product are mixed with 1.5 parts of the addition product obtained from pyrrolidin (tetrahydropyrrol) and carbon bisulfid and 40 parts of sulfur on the rolls, and the mass heated for 2 hours at about 155° C. A hard product is thus obtained.

Example 7: In the preceding example the pyrrolidin derivative is substituted by beta-beta-dimethyl-delta-methyltrimethylene-imin.

Example 8: 100 parts of the polymerization product are mixed with 8 parts of the addition product of dimethylamin and carbon disulfid and 45 parts of sulfur and the mass is heated for 3 hours at 145° C.

In the above examples the addition of the piperidin or other methylene base materially shortens the time required for vulcanization. If the process is continued for the usual time of vulcanization a lower temperature may be employed, or if the vulcanization is carried out at the usual temperature and for the usual time, a larger combination of sulfur is effected and a harder product is obtained. These results are much more marked than those obtained in the presence of other bases, such as pyridin, quinolin, dimethylanilin, etc., which hardly possess the property of accelerating and improving the vulcanization, while on the other hand they react upon the autopolymerization product converting it into a vulcanizable material as described in Serial No. 688762. Instead of the autopolymerization product, other caoutchouc-like polymerization products of beta-gamma-dimethylbutadiene can be vulcanized in the same or a similar manner to give the improved vulcanized products either hard or soft rubber, combined either physically or chemically with the piperidin or other methylene base.

While the autopolymerization product presents especial problems in its vulcanization, since in its untreated form it is brittle and spongy, nevertheless many of the advantages in the use of the piperidin base or other methylene base are also observed in the vulcanization of other beta-gamma-dimethylbutadiene caoutchoucs.

Among other piperidin compounds which can also be used may be mentioned n-thiopiperidin (Michaelis, *Berichte* 28, 1013) and benzaldipiperyl (*Journal f. pr. Chemie* (2) 36, p. 130) or other solid or liquid derivatives of piperidin or its homologues etc. The process can be carried out also in the presence of fillers and compounding materials incorporated with the rubber.

The vulcanized products resulting from the process of the above examples contain the sulfur of vulcanization, and a small amount of the base added combined therewith, either physically or chemically, or in part physically and in part chemically.

In our companion application, Serial No. 795,505, filed October 16, 1913, there is described and claimed the vulcanization of rubber, both natural and synthetic, with the addition of piperidin or other methylene base and the resulting products thereof, while in the present application the vulcanization of beta-gamma-dimethylbutadiene rubber is claimed specifically, and more specifically the vulcanization of the autopolymerization product of this hydrocarbon, together with the products resulting from such vulcanization.

We claim:—

1. The process of producing a vulcanized caoutchouc product which comprises incorporating with an autopolymerization product of beta-gamma-dimethyl-butadiene a small amount of a methylene base and heating the resulting product with a vulcanizing agent to effect vulcanization.

2. The process of producing a vulcanized caoutchouc product which comprises incorporating with an autopolymerization product of beta-gamma-dimethylbutadiene a small amount of a piperidin base, and heating the resulting product with a vulcanizing agent to effect vulcanization.

3. The process of producing a vulcanized caoutchouc product which comprises incorporating with an autopolymerization prodduct of beta-gamma-dimethyl-butadiene a small amount of piperidin, and heating the resulting product with a vulcanizing agent to effect vulcanization.

4. The process of producing a vulcanized coautchouc product which comprises incorporating a vulcanizing agent and a small amount of a methylene base not fugitive at the vulcanization temperature with beta-gamma-dimethyl-butadiene caoutchouc and heating the resulting product to effect vulcanization.

5. The process of producing a vulcanized caoutchouc product which comprises incorporating a vulcanizing agent and a small amount of a piperidin base with beta-gamma-dimethylbutadiene caoutchouc and heating the resulting product to effect vulcanization.

6. The process of producing a vulcanized caoutchouc product which comprises incorporating a vulcanizing agent and a small amount of piperidin with beta-gamma-dimethyl-butadiene caoutchouc and heating the resulting product to effect vulcanization.

7. As a new material, a vulcanized caoutchouc-like beta-gamma-dimethylbutadiene polymerization product combined with a small amount of a methylene base.

8. As a new material, a vulcanized caoutchouc-like beta-gamma-dimethylbutadiene polymerization product combined with a small amount of a piperidin base.

9. As a new material, a vulcanized caoutchouc-like beta-gamma-dimethylbutadiene polymerization product combined with a small amount of piperidin.

10. As a new material, a vulcanized caoutchouc-like polymerization product of beta-gamma-dimethylbutadiene combined with a small amount of a methylene base, and containing sufficient sulfur to form a hard rubber product.

11. As a new material, a vulcanized caoutchouc-like polymerization product of beta-gamma-dimethylbutadiene combined with a small amount of a piperidin base and containing sufficient sulfur to form a hard rubber product.

12. As a new material, a vulcanized caoutchouc-like polymerization product of beta-gamma-dimethylbutadiene combined with a small amount of piperidin and containing sufficient sulfur to form a hard rubber product.

In testimony whereof we have hereunto set our hands in the presence of two subscribing witnesses.

FRITZ HOFMANN. [L. S.]
KURT GOTTLOB. [L. S.]

Witnesses:
 HELEN NUFER,
 ALBERT NUFER.